Sept. 7, 1926.
S. T. ARTHUR
1,599,355
DISK SHARPENING MACHINE
Filed Nov. 5, 1925    2 Sheets-Sheet 1
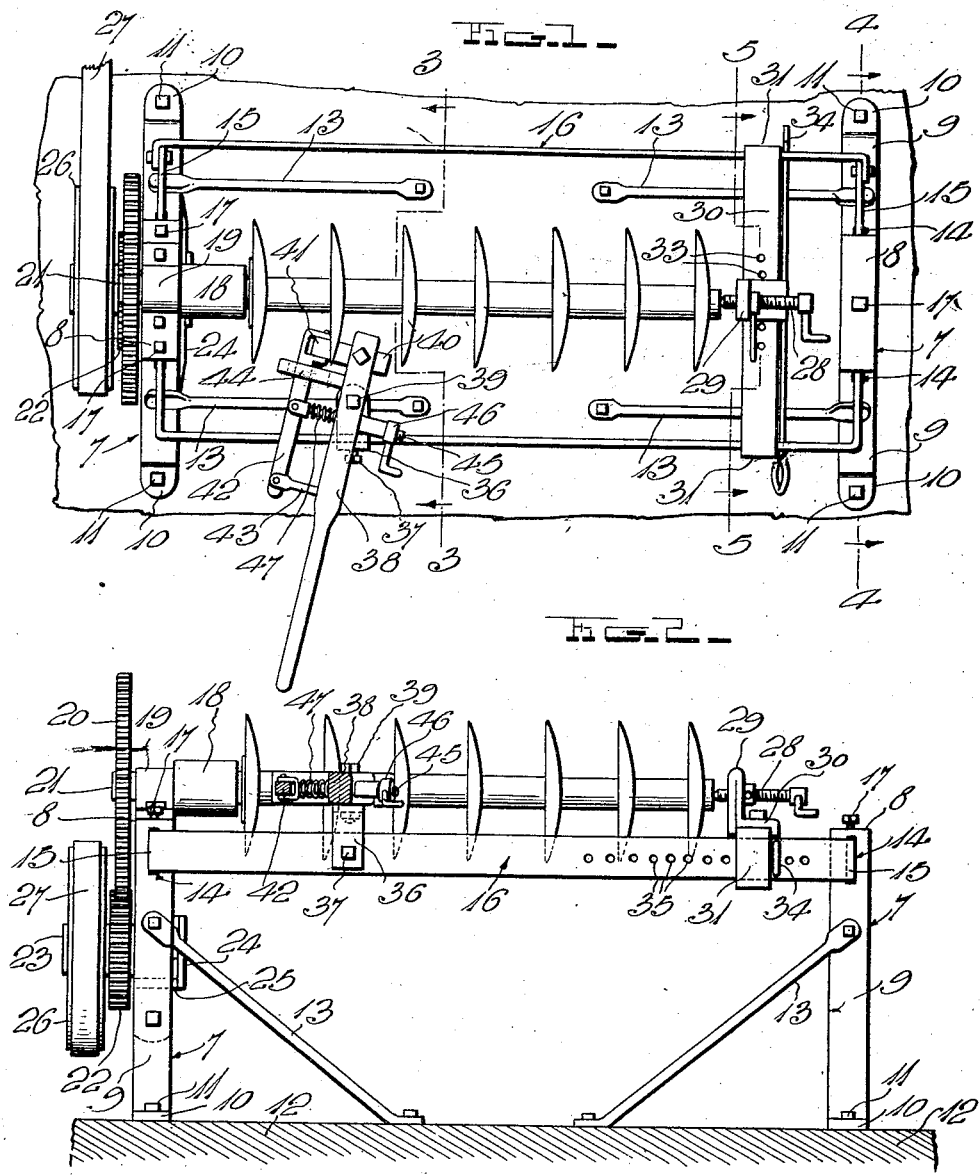
Witness
H. Woodard
Inventor
Samuel T. Arthur
By H. B. Wilson & Co.
Attorneys Sept. 7, 1926.
S. T. ARTHUR
1,599,355
DISK SHARPENING MACHINE
Filed Nov. 5, 1925   2 Sheets-Sheet 2
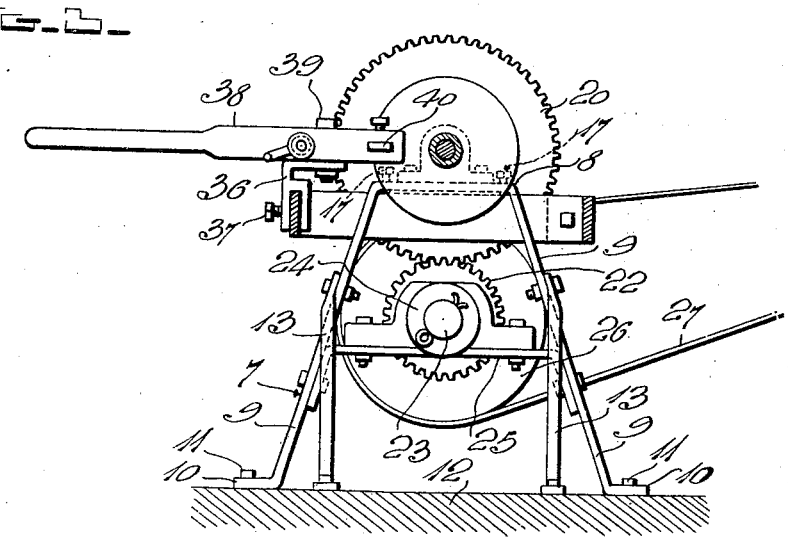
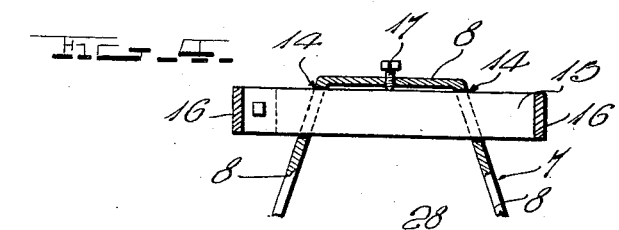
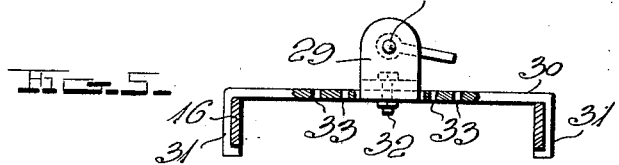
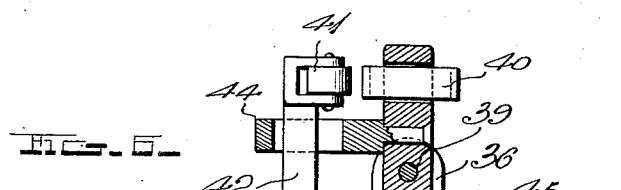
Inventor
Samuel T. Arthur
By
Attorneys
Witness
H. Woodard Patented Sept. 7, 1926.

1,599,355

UNITED STATES PATENT OFFICE.

SAMUEL T. ARTHUR, OF LANE, ILLINOIS.

DISK-SHARPENING MACHINE.

Application filed November 5, 1925. Serial No. 67,105.

My invention aims to provide a new and improved machine for sharpening disks of numerous kinds of agricultural machines, provision being made whereby the machine may be adjusted according to the size of the disks and may be set for sharpening either right or left hand disks.

With the foregoing in view, the invention resides in the novel subject matter hereinafter described and claimed, the description being supplemented by the accompanying drawings.

Figure 1 is a top plan view of a machine constructed in accordance with my invention.

Figure 2 is a side elevation partly in section.

Figures 3, 4 and 5 are transverse sectional views on lines 3—3, 4—4 and 5—5 of Fig. 1.

Figure 6 is a horizontal sectional view through the disk sharpening means.

In the drawings above briefly described, the numerals 7 designate two spaced, vertically disposed, end frames each of which is preferably formed for the most part, from a single length of metal bent into substantially arched form, so as to provide a horizontal crown bar 8 and a pair of legs 9 projecting downwardly therefrom, said legs having feet 10 adapted to be secured by lag screws or the like 11 to a floor 12. The legs are provided with appropriate braces 13 secured thereto and adapted to be fastened to the floor in any desired manner. The upper ends of the legs 9 of each end frame are provided with alined openings 14, and the end bars 15 of a rectangular cutter-supporting frame 16 pass slidably through these openings so that said frame 16 may be transversely adjusted with respect to the end frames 7. To hold the frame 16 in adjusted position, set screws 17 are threaded through the crown bars 8, to contact with the end bars 15 of said frame.

A disk-driving socket or the like 18 is rotatably supported by the crown bar of one of the end frames 7, a suitable bearing 19 being provided for that purpose, and any preferred driving means may be employed for the socket or the like 18. In the present showing, a gear 20 is shown on the shaft 21 of the socket, said gear meshing with a pinion 22 on a short shaft 23, this shaft being mounted in a bearing 24 secured to a bar 25 extending between two of the legs 9, as shown in Fig. 3. The shaft 23 is provided with a pulley 26 engaged with a driven belt 27.

The socket or the like 18 may engage one end of a gang of disks, as shown in the drawings, and the other end of such gang is supported by an adjustable center screw or bearing 28 which is threaded through the upper end of a bracket 29, the latter being adjustable longitudinally upon a bar 30 which extends transversely across one end of the frame 16, the ends of said bar 30 being bent downwardly and inwardly to provide guides 31 which slidably engage the parallel side bars of said frame 16. Adjustment of the bracket 24 along the bar 30, may be effected by means of a bolt 32 and a plurality of bolt holes 33 in said bar. It will also be seen that the bar 30 may be adjusted longitudinally of the frame 16, and to hold it in adjusted position, I provide a rod 34 which may be passed through any of a plurality of openings 35 in the side bars of the frame 16.

A bracket 36 is applicable to either side bar of the frame 16 and may be clamped thereto by a set screw 37. A hand lever 38 is fulcrumed at 39 to the upper end of this bracket, said lever being provided at one end with a disk sharpening cutter 40. A disk-engaging roller 41 serves to hold the cutter against the disk, said roller being carried by a lever 42 which is fulcrumed to a lateral arm 43 projecting from the lever 38, said lever 42 having an appropriate guide 44 carried by said lever 38. A bolt 45 is connected to lever 42 and passes through an opening in the lever 38, a suitable handled nut 46 being threaded on said bolt. By tightening this nut, the roller 41 and cutter 40 may be moved into operative relation with a disk to be sharpened. When the nut 46 is loosened, a coil spring 47 surrounding the bolt 45, swings the lever 42 away from the cutter 40 to permit the sharpening means to be disengaged from the sharpened disk.

By loosening the set-screws 17 and transversely adjusting the frame 16, and by making any necessary adjustment of the bracket 29 along the bar 30, the machine may be set for sharpening disks of any size. Moreover, it will be seen that the sharpening means may be used upon one side of the frame 16 for sharpening right hand disks and upon the other side of said frame for sharpening left hand disks. It is also to be observed that the bearing 28 may be adjusted toward or from the disk-driving member 18, according to the length of the gang of disks or the disk-carrying shaft, and it may be explained that the machine is not restricted to sharpening disks in which a great number are located in a gang, but may be used to equal advantage for sharpening lesser numbers. After any disk has been sharpened, the bracket 36 is loosened and adjusted along the frame 16, until the sharpening means can properly engage the next disk, and it will be obvious that the sharpening operation may be quickly and easily performed.

As excellent results are obtainable from the details disclosed, they are preferably followed. However, within the scope of the invention as claimed, variations may be made.

I claim:—

1. In a disk sharpening machine, a pair of spaced rigidly supported end frames, a cutter-carrying frame extending horizontally from one end frame to the other and having a transversely adjustable disk-supporting bearing near one of said end frames, a disk-driving member mounted on the other of said end frames in axial alinement with said bearing, means supporting the cutter-carrying frame on the end frames for adjustment transversely of the axial line of said bearing and said disk-driving member, and means for holding said cutter-carrying frame in adjusted position.

2. In a disk sharpening machine, an elongated cutter-carrying frame having parallel end bars, a pair of spaced rigidly supported end frames having guides in which said end bars are slidably received to permit transverse adjustment of the cutter-carrying frame with regard to the end frames, means for holding said cutter-carrying frame in adjusted position, a disk-driving member mounted on one of said end frames, and a transversely adjustable disk-supporting bearing mounted on said cutter-carrying frame.

3. In a disk sharpening machine, a pair of spaced end frames having parallel crown bars and legs at the ends of said crown bars, the legs of each frame having alined openings, a horizontal cutter-carrying frame having end bars passing slidably through said openings to support said cutter-carrying frame for transverse adjustment, set screws threaded through said crown bars for engagement with said end bars of the cutter-carrying frame to hold the latter in adjusted position, a disk-driving member mounted on one of said crown bars, and a disk-supporting bearing mounted on said cutter-carrying frame for adjustment transversely thereof.

4. A disk grinding machine embodying a horizontal cutter-carrying frame having parallel side bars, disk-driving means at one end of said frame, a disk-supporting bearing near the other end of the frame, a bracket carrying said bearing, a bar supporting said bracket and extending transversely across the frame, the ends of said bar being bent downwardly and inwardly to provide guides which slidably engage the side bars of the frame.

5. A disk sharpening means comprising a support, a hand lever fulcrumed between its ends on said support and having a cutter extending laterally from its front end, an arm projecting laterally from the hand lever in the same direction as the cutter, a second lever fulcrumed to said arm and having a disk-engaging roller opposed to said cutter, a guide for the second named lever rigidly carried by said hand lever, and screw-threaded means engaged with the two levers for effecting swinging thereof toward and from each other.

In testimony whereof I have hereunto affixed my signature.

SAMUEL T. ARTHUR.